United States Patent
Kohda et al.

(10) Patent No.: US 6,221,516 B1
(45) Date of Patent: Apr. 24, 2001

(54) RADIATION IMAGE STORAGE PANEL

(75) Inventors: Katsuhiro Kohda; Hisashi Yamazaki, both of Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/469,761

(22) Filed: Jun. 6, 1995

Related U.S. Application Data

(63) Continuation of application No. 08/333,325, filed on Nov. 2, 1994, now abandoned, which is a continuation of application No. 08/001,245, filed on Jan. 6, 1993, now abandoned, which is a continuation of application No. 07/704,738, filed on May 20, 1991, now abandoned, which is a continuation of application No. 07/423,208, filed on Oct. 18, 1989, now abandoned.

(30) Foreign Application Priority Data

Oct. 20, 1988 (JP) ............................... 63-265827

(51) Int. Cl.[7] ............... H05B 33/00; H05B 33/22; B32B 19/04
(52) U.S. Cl. ............. 428/690; 428/413; 428/421; 428/422; 250/484.4
(58) Field of Search ............... 428/421, 422, 428/413; 250/484.4

(56) References Cited

U.S. PATENT DOCUMENTS

| | | | | |
|---|---|---|---|---|
| 3,775,171 | * | 11/1973 | Hermes | 428/451 |
| 4,563,580 | * | 1/1986 | Ishizuka et al. | 428/690 |
| 4,645,721 | * | 2/1987 | Arakawa et al. | 428/690 |
| 4,661,419 | * | 4/1987 | Nakamura | 428/690 |
| 4,689,278 | * | 8/1987 | Umemoto et al. | 428/691 |
| 4,728,798 | * | 3/1988 | Fukuda et al. | 428/670 |
| 4,741,993 | * | 5/1988 | Kano et al. | 430/536 |
| 4,825,085 | * | 4/1989 | Tsuchino et al. | 250/484.1 |
| 4,861,667 | * | 8/1989 | Takayanagi et al. | 428/421 |
| 4,863,826 | * | 9/1989 | Arakawa et al. | 430/138 |
| 4,939,018 | * | 7/1990 | Kohda et al. | 428/690 |
| 4,963,751 | * | 10/1990 | Kano | 250/484.1 |
| 4,983,834 | * | 1/1991 | Lindmayer et al. | 250/327.2 |
| 5,021,671 | * | 6/1991 | Kohda et al. | 250/484.1 |
| 5,023,461 | * | 6/1991 | Nakazawa et al. | 250/484.1 |

* cited by examiner

*Primary Examiner*—Ellis Robinson
(74) *Attorney, Agent, or Firm*—Nixon Peabody LLP; Jeffrey L. Costellia

(57) ABSTRACT

A radiation image storage panel has a phosphor layer which comprises a stimulable phosphor, and a protective film. The protective film is a coated layer containing at least 30% by weight of a fluorine-containing resin which is soluble in an organic solvent, such as a copolymer derived from a fluoroolefin and other copolymerizable monomer, polytetrafluoroethylene or a modified polytetrafluoroethylene.

3 Claims, No Drawings

RADIATION IMAGE STORAGE PANEL

This application is a Continuation of Ser. No. 08/333,325, filed Nov. 2, 1994, now abandoned, which itself is a continuation of Ser. No. 08/001,245 filed Jan. 6, 1993, now abandoned, which is a continuation of Ser. No. 07/704,738 filed May 20, 1991 now abandoned, which is a continuation of Ser. No. 07/423,208 filed Oct. 18, 1989, now abandoned.

BACKGROUND OF THE INVENTION

1. Field of the Invention

This invention relates to a radiation image storage panel which is employable in a radiation image recording and reproducing method utilizing a stimulable phosphor.

2. Description of Prior Art

As a method replacing a conventional radiography, a radiation image recording and reproducing method utilizing a stimulable phosphor is described, for instance, in U.S. Pat. No. 4,239,968 and is practically used. In the method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals. After the reproduction (reading) of the radiation image is completed, the remaining image is erased from the radiation image storage panel and the panel is stored for the next radiographic process, that is, the panel is generally used repeatedly after the recorded image is erased.

In the radiation image recording and reproducing method, a radiation image is obtainable with a sufficient amount of information by applying a radiation to an object at a considerably smaller dose, as compared with the conventional radiography using a combination of a radiographic film and a radiographic intensifying screen. Moreover, the radiation image recording and reproducing method is advantageous from the viewpoints of conservation of resources and economic efficiency because the radiation image storage panel can be repeatedly employed in the method, while the radiographic film is consumed for each radiographic process in the conventional radiography.

The radiation image storage panel employed in the above-described method generally comprises a support and a stimulable phosphor layer provided on one surface of the support. However, if the phosphor layer is self-supporting, the support may be omitted.

As the stimulable phosphor layer, there are known not only a phosphor layer comprising a binder and a stimulable phosphor dispersed therein but also a phosphor layer composed of only an agglomerate of a stimulable phosphor (not containing a binder), which is formed through deposition process or sintering process. The present applicants have already applied for patent with respect to a radiation image storage panel having other type of a stimulable phosphor layer in which voids of a stimulable phosphor agglomerate are impregnated with a polymer material (U.S. application Ser. No. 184,010). In each of the above-mentioned phosphor layers, the stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

On the free surface (surface not facing the support) of the phosphor layer is generally provided a film (i.e., protective film) to protect the phosphor layer from chemical deterioration or physical shock.

The protective film can be formed on the phosphor layer by coating the surface of the phosphor layer with a solution of a transparent organic polymer material such as a cellulose derivative or polymethyl methacrylate, and drying the coated solution. Alternatively, the protective film can be provided on the phosphor layer by beforehand preparing a film of an organic polymer material such as polyethylene terephthalate, or a transparent glass sheet, followed by placing and fixing it onto the phosphor layer with an appropriate adhesive agent. Otherwise, the protective film can be also provided by depositing an inorganic material on the phosphor layer.

Among the protective films prepared by the above-described various methods, the protective film formed by coating a solution for the formation of a protective film has such advantages that the bonding strength with the phosphor layer is high and the process for the formation of the protective film is relatively simple. Particularly, a radiation image storage panel whose phosphor layer and protective film are formed simultaneously through simultaneous superposition coating, which has been already applied for patent (Japanese Patent Provisional Publications No. 61(1986)-61100 and No. 61(1986)-80100), shows improved sensitivity and gives an image of higher quality in addition to enhanced bonding strength between the protective film and the phosphor layer, as compared with the known radiation image storage panels.

In the radiation image recording and reproducing method, the radiation image storage panel is repeatedly used in a cyclic procedure comprising the steps of exposure of the panel to a radiation (i.e., recording procedure of a radiation image), irradiation of the panel with stimulating rays (i.e., read-out procedure of the recorded radiation image) and irradiation of the panel with light for erasure (i.e., erasing procedure of the remaining radiation image). Transferring of the radiation image storage panel from one step to the subsequent step is conducted by using a transferring means such as a belt or a roller, and the panel is generally piled on other panels to be stored after one cycle is finished. When the radiation image storage panel having a protective film formed by the above-mentioned coating method is repeatedly used as described above, the sensitivity of the panel sometimes lowers little by little. Since the radiation image recording and reproducing method is very useful for obtaining a radiation image as a visible image as described hereinbefore, it is desired for the radiation image storage panel employed in the method to have a high sensitivity and provide an image of high quality (high sharpness, high graininess, etc.), as well as the radiographic intensifying screen employed in the conventional radiography. Accordingly, it is very important to prevent the above-mentioned lowering (i.e., reduction) of the sensitivity of the radiation image storage panel.

SUMMARY OF THE INVENTION

It is an object of the present invention to provide a radiation image storage panel having a protective film formed by a coating method, which is almost free from lowering of sensitivity even if the panel is repeatedly used.

There is provided by the present invention a radiation image storage panel having a phosphor layer comprising a stimulable phosphor, and a protective film, wherein the protective film is a coated layer containing at least 30% by weight of a fluorine-containing resin which is soluble in an organic solvent.

The terms "fluorine-containing resin" used herein means to include a homopolymer of fluorine-containing olefin (i.e., fluoroolefin) or a copolymer derived from a fluorine-containing olefin and other copolymerizable monomer.

In the protective film, the fluorine-containing resin may be crosslinked.

The present inventors have studied on causes of the lowering of the sensitivity, and found that a portion on the surface of the protective film of the panel which is in contact with the transferring members such as a belt or a roller is tainted (stained) with a plasticizer, etc. oozing out of the transferring members to lower the sensitivity of the panel.

In more detail, the transferring members such as a belt and a roller are generally made of a rubber, a plastic material or other material, which contains a plasticizer or other additives, so that the plasticizer or the like oozing out of the transferring members stains the surface of the protective film which is in direct contact with the transferring members. Reading of a radiation image from the radiation image storage panel is generally carried out by irradiating the panel with stimulating rays from the surface side of the protective film, and therefore the stain on the surface of the protective film disturbs transmitting of the stimulating rays or the stimulated emission in the reading procedure to lower the sensitivity of the panel.

In the known radiation image storage panels having a protective film of an organic polymer material which is formed by a conventional coating method, the stain given by the transferring members permeates inside of the protective film, and such stain can be hardly removed off even by wiping or other the like.

The radiation image storage panel of the invention is a radiation image storage panel having a coated protective film of the specific material, which is almost free from permeation of stains given by plasticizers or the like oozing from the transferring members such as a belt or a roller, and from which stains deposited on the surface can be easily removed by wiping or other procedures.

The protective film containing the fluorine-containing resin in the specific amount can be hardly soaked with a stain given by a plasticizer or the like oozing from the transferring members such as a belt or a roller, so that even if the plasticizer once stains the surface of the protective film, the stain can be easily removed from the surface by wiping or other procedure.

In the present invention, a fluorine-containing resin which is soluble in an organic solvent is employed as a material of the protective film, and accordingly, the protective film can be readily formed by dissolving the resin in an appropriate solvent to prepare a coating solution, coating the solution over the surface of the phosphor layer, and drying the coated solution.

DETAILED DESCRIPTION OF THE INVENTION

The radiation image storage panel of the invention is now described in more detail.

The stimulable phosphor of the phosphor layer of the panel of the invention is described below.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel according to the invention include:

SrS:Ce,Sm, SrS:Eu,Sm, ThO$_2$:Er, and La$_2$O$_2$S:Eu,Sm;

ZnS:Cu,Pb, BaO.xAl$_2$O$_3$:Eu, in which x is a number satisfying the condition of $0.8 \leq x \leq 10$, and M$^{2+}$.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$;

(Ba$_{1-x-y}$, Mg$_x$,Ca$_y$)FX:aEu$^{2+}$, in which X is at least one element selected from the group consisting of Cl and Br, x and y are numbers satisfying the conditions of $0 \leq x+y \leq 0.6$ and $xy \neq 0$, and a is a number satisfying the condition of $10^{-6} \leq a \leq 5 \times 10^{-2}$;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$;

(Ba$_{1-x}$,M$^{II}_x$)FX:yA, in which M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively;

M$^{II}$FX.xA:yLn, in which M$^{II}$ is at least one element selected from the group consisting of Ba, Ca, Sr, Mg, Zn and Cd; A is at least one compound selected from the group consisting of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times^{-5} \leq x \leq 0.5$ and $0 < y \leq 0.2$, respectively;

(Ba$_{1-x}$,M$^{II}_x$)F$_2$.aBaX$_2$:yEu,zA, in which M$^{II}$ is at least one element selected from the group consisting of Be, Mg, Ca, Sr, Zn and Cd; X is at least one element 15 selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 10^{-2}$, respectively;

(Ba$_{1-x}$, M$^{II}_x$)F$_2$.aBaX$_2$:yEu,zB, in which M$^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 2 \times 10^{-1}$, respectively;

$(Ba_{1-x}, M''_x)F_2 \cdot aBaX_2:yEu,zA$, in which $M''$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively;

$M'''OX:xCe$, in which M is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively;

$BaFX \cdot xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.1$ and $0 < y \leq 0.1$, respectively;

$BaFX \cdot xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively;

$BaFX \cdot xNaX':aEu^{2+}$, in which each of X and X' is at least one halogen selected from the group consisting of Cl, Br and I; and x and a are numbers satisfying the conditions of $0 < x \leq 2$ and $0 < a \leq 0.2$, respectively;

$M''FX \cdot xNaX':yEu^{2+}:zA$, in which $M''$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y < 0.2$ and $0 < z \leq 10^{-2}$, respectively;

$M''FX \cdot aM'X' \cdot bM''X''_2 \cdot cM'''X'''_3 \cdot xA:yEu^{2+}$, in which $M''$ is at least one alkaline earth metal selected from the group consisting of Ba, Sr and Ca; $M'$ is at least one alkali metal selected from the group consisting of Li, Na, K, Rb and Cs; $M''$ is at least one divalent metal selected from the group consisting of Be and Mg; $M'''$ is at least one trivalent metal selected from the group consisting of Al, Ga, In and Tl; A is at least one metal oxide; X is at least one halogen selected from the group consisting of Ct, Br and I; each of X', X'' and X''' is at least one halogen selected from the group consisting of F, CL, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively;

$M''X_2 \cdot aM''X':xEu^{2+}$, in which $M''$ is at least one alkaline earth metal selected from the group consisting of Ba, Sr and Ca; each of X and XI is at least one halogen selected from the group consisting of CL, Br and I, and X=X'; and a and x are numbers satisfying the conditions of $0.1 \leq a \leq 10.0$ and $0 < x \leq 0.2$, respectively;

$M''FX \cdot aM'X':xEu^{2+}$, in which $M''$ is at least one alkaline earth metal selected from the group consisting of Ba, Sr and Ca; $M'$ is at least one alkali metal selected from the group consisting of Rb and Cs; X is at least one halogen selected from the group consisting of Cl, Br and I; X' is at least one halogen selected from the group consisting of F, CL, Br and I; and a and x are numbers satisfying the conditions of $0 < a \leq 4.0$ and $0 < x \leq 0.2$, respectively; and $M'X:xBi$, in which $M'$ is at least one alkali metal selected from the group consisting of Rb and Cs; X is at least one halogen selected from the group consisting of Cl, Br and I; and x is a number satisfying the condition of $0 < x \leq 0.2$.

The $M''X_2 \cdot aM''X'_2:xEu^{2+}$ phosphor may further contain the following additives for 1 mol of $M''X_2 \cdot aM''X'_2$.

$bM'X''$, in which $M'$ is at least one alkali metal selected from the group consisting of Rb and Cs; X'' is at least one halogen selected from the group consisting of F, Cl, Br and I; and b is a number satisfying the condition of $0 < b \leq 10.0$;

$bKX'' \cdot cMgX'''_2 \cdot dM'''X''''_3$, in which $M'''$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leq b \leq 2.0$, $0 \leq c \leq 2.0$ and $0 \leq d \leq 2.0$, and $2x^{-5} \leq b+c+d$;

bA, in which A is at least one oxide selected from the group consisting of $SiO_2$ and $P_2O_5$; and b is a number satisfying the condition of $10^{-4} \leq b \leq 2 \times 10^{-1}$;

yB (boron), in which y is a number satisfying the condition of $2 \times 10^{-4} \leq b \leq 2 \times 10^{-1}$;

bSiO, in which b is a number satisfying the condition of $0 < b \leq 3 \times 10^{-2}$;

$bSnX''_2$, in which X'' is at least one halogen selected from the group consisting of F, Cl, Br and I; and b is a number satisfying the condition of $0 \leq b \leq 10^{-3}$;

$bCsX'' \cdot cSnX'''_2$, in which each of X'' and X''' is at least one halogen selected from the group consisting of F, Cl, Br and I; and b and c are numbers satisfying the conditions of $0 < b \leq 10.0$ and $10^{-6} \leq c \leq 2 \times 10^{-2}$, respectively; and $bCsX'' \cdot yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leq 10.0$ and $10^{-6} \leq y \leq 1.8 \times 10^{-1}$, respectively.

Among the above-described stimulable phosphors, the divalent europium activated alkaline earth metal halide phosphor is particularly preferred, because the phosphor shows stimulated emission of high luminance. The above-described stimulable phosphors are by no means given to restrict the stimulable phosphor employable in the present invention, and any other phosphors can be also employed, provided that the phosphor gives stimulated emission when excited with stimulating rays after exposure to a radiation.

As the phosphor layer of the radiation image storage panel of the invention, there can be employed various types of phosphor layers such as a phosphor layer comprising a binder and a stimulable phosphor dispersed therein, a phosphor layer composed of only an agglomerate of a stimulable phosphor not containing a binder, or a phosphor layer wherein voids of a stimulable phosphor agglomerate are impregnated with a polymer material.

A process for the preparation of the radiation image storage panel of the invention will be described hereinafter, by refering to a radiation image storage panel whose phosphor layer comprises a binder and a stimulable phosphor dispersed therein.

The phosphor layer can be formed on a support, for example, by the following process.

In the first place, the above-described stimulable phosphor and a binder are added to an appropriate solvent, and they are well mixed to to prepare a dispersion (i.e., coating dispersion for the formation of a phosphor layer) in which the phosphor particles are homogeneously dispersed in a binder solution.

Examples of the binders employable for the phosphor layer include: natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butylate, polyvinyl alcohol and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate.

Examples of the solvents employable in the preparation of the coating dispersion include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether and ethylene glycol monomethyl ether; and mixtures of the above-mentioned compounds.

A ratio between the binder and the stimulable phosphor in the coating dispersion is determined according to the characteristics of the aimed radiation image storage panel and the nature of the phosphor employed. Generally, the ratio therebetween is within the range of from 1:1 to 1:100 (binder : phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agents include phthalic acid, stearic acid, caproic acid and a hydrophobic surface active agent. Examples of the plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butyl phthalyl butyl glycolate; and polyesters of polyethylene glycols with aliphatic dicarboxylic acids such as polyester of triethylene glycol with adipic acid and polyester of diethylene glycol with succinic acid.

In the second place, the coating dispersion containing the stimulable phosphor and the binder prepared as above is evenly coated on the surface of a support to form a layer of the coating dispersion. The coating procedure can be carried out by a conventional coating method such as a method of using a doctor blade, a roll coater or a knife coater.

A support material employable for the radiation image storage panel of the invention can be selected from those used in the known radiation image storage panels. Examples of the support materials include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; papers sized with polyvinyl alcohol or the like; and plates or sheets of ceramics such as alumina, zirconia, magnesia and titania.

In known radiation image storage panels, one or more additional layers are occasionally provided between the support and the phosphor layer, so as to enhance the adhesion between the support and the phosphor layer, or to improve the sensitivity of the panel or the quality of an image (sharpness and graininess) provided thereby. For example, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the radiation image storage panel of the invention, one or more those additional layers may be provided, and the constitution thereof can be optionally selected depending upon the purpose of the radiation image storage panel.

As described in U.S. Pat. No. 4,575,635, the phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of a radiation image.

After the coating dispersion is coated over the support as described above, the coated layer of the dispersion is dried to complete the formation of a phosphor layer. The thickness of the phosphor layer varies depending upon the characteristics of the aimed radiation image storage panel, the nature of the phosphor layer, the ratio between the binder and the phosphor, etc. Generally, the thickness of the phosphor layer is within the range of 20 $\mu$m to 1 mm, preferably 50 to 500 $\mu$m.

The phosphor layer can be formed on the support by the methods other than that given in the above. For example, the phosphor layer is initially prepared on a sheet (false support) such as a glass plate, a metal plate or a plastic sheet using the aforementioned coating dispersion and then thus prepared phosphor layer is overlaid on the genuine support by pressing or using an adhesive agent.

On the phosphor layer of the radiation image storage panel of the invention is provided a protective film which is a coated layer containing a fluorine-containing resin which is soluble in an organic solvent, that is a characteristic requisite of the invention. The protective film is described below.

The protective film can be formed on the phosphor layer by evenly coating a solution for the formation of a protective film containing a fluorine-containing resin which is soluble in an organic solvent over the surface of the phosphor layer using a known coating means such as a doctor blade, and drying the coated layer of the solution. The protective film can be also formed simultaneously with forming the phosphor layer through simultaneous superposition coating.

The fluorine-containing resin is a homopolymer of fluorine-containing olefin (i.e., fluoroolefin), or a copolymer derived from a fluorine-containing olefin and other copolymerizable monomer. The fluorine-containing resin can be modified fluorine-containing resin. The modification is generally made to enhance the solubility of the resin. Examples of the fluorine-containing resins include polytetrafluoroethylene, polychlorotrifluoroethylene, polyvinyl fluoride, polyvinylidene fluoride, tetrafluoroethylene-hexafluoropylene copolymer and fluoroolefin-vinyl ether copolymer.

Fluorine-containing resins are generally insoluble in organic solvents, but copolymers derived from a fluoroolefin and other copolymerizable monomer can be made soluble by choosing an appropriate copolymerizable monomer, and therefore a protective film can be readily formed by dissolving the fluorine-containing resin in an appropriate solvent to prepare a coating solution, coating the solution over the phosphor layer, and drying the coated solution. An example of such copolymer is a fluoroolefin-vinyl ether copolymer. Further, polytetrafluoroethylene and a modified product thereof are soluble in fluorine-containing organic solvents such as a perfluorinated solvent, so that they can be also employed for the formation of a protective film as well as the above-mentioned copolymers containing fluoroolefin as a copolymer component.

The protective film of the radiation image storage panel of the invention may contain other resins than the fluorine-containing resin, crosslinking agents, hardening agents and anti-yellowing agents, but for the accomplishment of the aforementioned object, the fluorine-containing resin should be contained in the protective film in an amount of not less than 30% by weight, preferably not less than 50% by weight, more preferably not less than 70% by weight. Examples of the resins other than the fluorine-containing resin employable for the protective film include polyurethane resins, polyacrylic resins, cellulose derivatives, polymethyl methacrylate, polyester resins and epoxy resins.

The fluorine-containing resin employed in the invention is preferably crosslinked, because the strength of the resin can be increased to enhance the durability of the resulting protective film when the resin is crosslinked.

Accordingly, the above-mentioned coating solution for the formation of a protective film may contain resins other than the fluorine-containing resin, a crosslinking agent, etc. Further, other additives such as an anti-yellowing agent can be also contained in the coating solution.

For the purpose of improving the sharpness of an image provided by the radiation image storage panel, at least one layer of the above-mentioned layers constituting the panel may be colored with such a colorant as absorbs only stimulating rays but not absorbs stimulated emission, as described in Japanese Patent Publication No. 54(1979)-23400.

Examples of the present invention and comparison examples are given below, but the examples are construed by no means to restrict the invention.

EXAMPLE 1

As materials for the formation of a phosphor layer, 600 g of a stimulable phosphor ($BaFBr_{0.8}I_{0.2}$:0.001OOEu$^{2+}$), 15.8 g of a polyurethane resin (Desmolac 4125, trade name of Sumitomo Bayer Urethane Co., Ltd.) and 2.0 g of an epoxy resin of bisphenol A type were added to a mixture solvent of methyl ethyl ketone and toluene (methyl ethyl ketone:toluene=1:1), and they were mixed using a propeller mixer to prepare a coating dispersion for the formation of a phosphor layer having a viscosity of 25 to 30 PS.

The coating dispersion was coated over a support having been provided with an undercoating layer using a doctor blade, and then the coated dispersion was dried at 100° C. for 15 minutes to form a phosphor layer on the support.

Independently, as materials for the formation of a protective film, 70 g of a fluoroolefin-vinyl ether copolymer (fluorine-containing resin, Lumifron LF100, trade name of Asahi Glass Co., Ltd.), 25 g of isocyanate (crosslinking agent, Desmodule Z4370, trade name of Sumitomo Bayer Urethane Co., Ltd.) and 5 g of an epoxy resin of bisphenol A type were added to a mixture solvent of toluene and isopropyl alcohol (toluene:isopropyl alcohol=1:1), to prepare a coating solution for the formation of a protective film having a viscosity of 2 to 3 PS.

The coating solution was coated on the above-prepared phosphor layer using a doctor blade, and the coated solution was then thermoset and dried at 120° C. for 30 minutes to form a protective film having a thickness of 10 μm on the phosphor layer.

Thus, a radiation image storage panel of the present invention was prepared.

COMPARISON EXAMPLE 1

The procedure of Example 1 was repeated except for using as materials for the formation of a protective film 70 g of a polyurethane resin (Desmolac 4125, trade name of Sumitomo Bayer Urethane Co., Ltd.), 25 g of isocyanate (crossliking agent, Desmodule Z4370, trade name of Sumitomo Bayer Urethane Co., Ltd.) and 5 g of an epoxy resin of bisphenol A type, to prepare a radiation image storage panel.

EXAMPLE 2

The procedure of Example 1 was repeated except for using as materials for the formation of a protective film 75 g of a fluoroolefin-vinyl ether copolymer (fluorine-containing resin, Lumifron LF200, trade name of Asahi Glass Co., Ltd.), 25 g of hexamethylol melamine (crossliking agent), 5 g of an epoxy resin of bisphenol A type and 1 g of alkyldiallylphosphite (anti-yellowing agent), to prepare a radiation image storage panel of the present invention.

COMPARISON EXAMPLE 2

The procedure of Example 2 was repeated except for sing as materials for the formation of a protective film 75 g of a polyurethane resin (Chrisbon 3354, trade name of Dainippon Ink & Chemicals Inc.), 25 g of isocyanate (crossliking agent, Sumidule L, trade name of Sumitomo Bayer Urethane Co., Ltd.), 5 g of an epoxy resin of bisphenol A type and 1 g of alkyldiallyphosphite (anti-yellowing agent), to prepare a radiation image storage panel.

Evaluation of Radiation Image Storage Panel

Four types of the radiation image storage panels prepared as above were evaluated on tendency of staining and the sensitivity according to the following tests.

Test 1 (Observation of Staining)

On the surface of the protective film of each radiation image storage panel was placed four kinds of transferring members (i.e., polyurethane rubber roller, nitrile rubber belt, polyester belt and nitrile rubber sucker).

The radiation image storage panel having the transferring members thereon was allowed to stand at 60° C. and 80%RH for 24 hours. After the surface of the protective film was wiped with isopropyl alcohol, the radiation image storage panel was exposed to X-rays and sequentially stimulated with He—Ne laser beam to obtain a radiation image. Each of the obtained radiation images was observed with respect to the influence thereon given by staining of the panel.

As a result, no change was observed on the images provided by the radiation image storage panels of Examples 1 and 2, but on the images provided by the radiation image storage panels of Comparison Examples 1 and 2, reduction of the sensitivity was observed on the portions which were in contact with the transferring members.

Further, when the surface of the protective film was observed, there was found discoloration (i.e., color change)

on the portions which were in contact with the transferring members in the radiation image storage panels of Comparison Examples 1 and 2, but found no discoloration in the radiation image storage panels of Examples 1 and 2.

Test 2 (Measurement of Sensitivity)

From the data obtained in the above-mentioned test with respect to the radiation image storage panels of Examples 1 and 2 and Comparison Examples 1 and 2, the sensitivity (stimulated emission) of those panels on the portions which were in contact with the transferring members was calculated, to compare with the sensitivity measured before the panels were brought into contact with the transferring members.

The results are set forth in Table 1, in which the values are relative values based on the sensitivity measured before the panels are brought into contact with the transferring members being 100.

TABLE 1

|  | Polyurethane Rubber Roller | Nitrile Rubber Belt | Polyester Belt | Nitrile Rubber Sucker |
| --- | --- | --- | --- | --- |
| Example 1 | 98 | 99 | 100 | 95 |
| Example 2 | 100 | 97 | 100 | 95 |
| Com. Ex. 1 | 80 | 65 | 83 | 40 |
| Com. Ex. 2 | 75 | 68 | 79 | 45 |

As is evident from the results set forth in Table 1, the radiation image storage panels of Examples 1 and 2 according to the invention showed reduction of the sensitivity of utmost only about 5% (the reduction of the sensitivity was such a low level that any change was not observed on the images as described in the test 1), but the panels of Comparison Examples 1 and 2 showed reduction of the sensitivity of at least 17%.

EXAMPLE 3

The procedure of Example 1 was repeated except for using as materials for the formation of a protective film 70 g of a fluoroolefin-vinyl ether copolymer (fluorine-containing resin, Fluonate K700, trade name of Dainippon Ink & Chemicals Inc.) and 30 g of isocyanate (crossliking agent, Sumidule N, trade name of Sumitomo Bayer Urethane Co., Ltd.), to prepare a radiation image storage panel of the present invention.

EXAMPLE 4

On the phosphor layer prepared in the same manner as described in Example 1 was coated a 5 wt. % perfluoro solvent solution of modified polytetrafluoroethylene (fluorine-containing resin) (CYTOP, trade name of Asahi Glass Co., Ltd.) using a doctor blade, and the coated solution was dried at room temperature for 10 minutes. The coated layer of the solution was further dried at 120° C. for 5 minutes to completely remove the remaining solvent, so as to form a protective film having a thickness of 10 Um on the phosphor layer. Thus, a radiation image storage panel of the present invention was prepared.

EXAMPLE 5

A modified polytetrafluoroethylene (copolymer of bis-2, 2-trifluoromethyl-4,5-difluoro-1,3-dioxiole and tetrafluoroethylene, TEFLON AF-1600, trade name of Dupon Ltd.) was dissolved in a fluorine-containing organic solvent (FLUORINERT FC-75, trade name of Sumitomo 3M Co. Ltd.) to prepare a 4 wt. % solution. The procedure of Example 4 was repeated except for using the above-prepared solution as a coating solution for the formation of a protective film, to prepare a radiation image storage panel.

Evaluation of Radiation Image Storage Panel

The radiation image storage panels prepared in Examples 3 to 5 were evaluated on tendency of staining and the sensitivity according to the following tests.

Test 3 (Observation of Staining)

The radiation image storage panels prepared in Examples 3 to 5 were subjected to the same test as the above-described test 1.

As a result, no change was observed on the image provided by each of the radiation image storage panels of Example 3 to 5 even after the panel was brought into contact with the transferring members.

Test 4 (Measurement of Sensitivity)

The radiation image storage panels prepared in Examples 3 to 5 were subjected to the same test as the above-described test 2.

The results are set forth in Table 2, in which the values are relative values based on the sensitivity measured before the panels are brought into contact with the transferring members being 100.

TABLE 2

|  | Polyurethane Rubber Roller | Nitrile Rubber Belt | Polyester Belt | Nitrile Rubber Sucker |
| --- | --- | --- | --- | --- |
| Example 3 | 97 | 96 | 96 | 95 |
| Example 4 | 100 | 98 | 100 | 98 |
| Example 5 | 99 | 100 | 100 | 99 |

As is evident from the results set forth in Table 2, the radiation image storage panels of Examples 3 to 5 according to the invention showed reduction of the sensitivity of utmost only about 5%.

From the examples of the invention and the results obtainaed by the above-mentioned tests, it was confirmed that the radiation image storage panels of the invention had a protective film formed by a coating method which was almost free from permeation of stains caused by plasticizers or the like oozing out of the transferring members such as a belt or a roller and from which stains applied thereon were easily removed by wiping.

What is claimed is:

1. A radiation image storage panel which comprises a stimulable phosphor layer and a protective film directly coated on the phosphor layer, wherein the protective film comprises a crosslinked copolymer derived from a fluoroolefin and vinyl ether.

2. The radiation image storage panel as defined in claim 1, wherein the protective film further contains an epoxy resin.

3. The radiation image storage panel as defined in claim 1, wherein the protective film further contains an epoxy resin and a crosslinking agent.

* * * * *